United States Patent [19]

Petersen et al.

[11] 4,342,227

[45] Aug. 3, 1982

[54] PLANAR SEMICONDUCTOR THREE DIRECTION ACCELERATION DETECTING DEVICE AND METHOD OF FABRICATION

[75] Inventors: Kurt E. Petersen; Anne C. Shartel, both of San Jose, Calif.

[73] Assignee: International Business Machines Corporation, Armonk, N.Y.

[21] Appl. No.: 219,685

[22] Filed: Dec. 24, 1980

[51] Int. Cl.³ .............................................. G01P 15/125
[52] U.S. Cl. ..................................... 73/510; 73/517 R
[58] Field of Search ............. 73/514, 510, 515, 516 R, 73/517 R, 517 B, 862.48

[56] References Cited

U.S. PATENT DOCUMENTS

| | | | |
|---|---|---|---|
| 3,084,558 | 4/1963 | Wilcox et al. | 73/517 |
| 3,229,530 | 1/1966 | Wilcox et al. | 73/517 |
| 3,478,604 | 11/1969 | Evans | 73/517 |
| 3,513,711 | 5/1970 | Rogall et al. | 73/517 |
| 3,572,109 | 3/1971 | Yerman | 73/141 |
| 3,877,313 | 4/1975 | Ferriss | 73/516 R |
| 3,911,738 | 10/1975 | Fischer | 73/141 R |
| 4,009,607 | 3/1977 | Ficken | 73/141 R |
| 4,071,838 | 1/1978 | Block | 338/47 |
| 4,094,199 | 6/1978 | Holdren et al. | 73/517 B |
| 4,129,042 | 12/1978 | Rosuold | 73/727 |
| 4,144,516 | 3/1979 | Aine | 338/2 |

OTHER PUBLICATIONS

Simon Middelhoek, James B. Angell & D. J. W. Noorlag "Microprocessors Get Integrated Sensors"; IEEE Spectrum; 2–80 pp. 42–45 at p. 44 Col. 2, and Figs. [3] and [4] on p. 45.

J. J. Fatula Jr., P. L. Garbarino & P. J. Tsang; "Acoustical Spectrum Analyzer on a Chip;" IBM TDB, vol. 22 No. 11, Apr. 1980; p. 4906 and pp. 4907–4908.

Primary Examiner—James J. Gill
Attorney, Agent, or Firm—George E. Roush

[57] ABSTRACT

This device comprises a v-shaped cavity in a planar semiconductor substrate having a substantially thin-walled v-shaped cantilever beam inset therein. The beam is movable in directions normal to and laterally of the plane of the substrate, whereby acceleration is sensed in both of these directions. A planar substrate of n-type silicon is arranged with the major face oriented in the (100) plane. A v-shaped groove is anisotropically etched in the substrate and capacitor electrode regions are diffused into the sloping walls. An epitaxial layer is grown over this substrate, and over that a layer of insulation is added. A layer of conductive material is laid down on the insulation to define an electrode. The substrate is again subjected to an anisotropic etchant for cutting the epitaxial layer from under the cantilever beam formed of the insulating layer and the conducting layer. The electrodes form two variable capacitors which are connected in parallel or differentially to simple circuitry laid down on the same substrate for resolving the bidirectional movement of the beam. Three such devices appropriately oriented, and compatible electronic circuitry, enable all three spatial coordinates to be probed with a single substrate assembly.

10 Claims, 8 Drawing Figures

PLANAR SEMICONDUCTOR THREE DIRECTION ACCELERATION DETECTING DEVICE AND METHOD OF FABRICATION

FIELD

The invention relates to acceleration devices, and it particularly pertains to planar semiconductor structures capable of all three degrees of freedom in detecting acceleration components of interest.

BACKGROUND

Acceleration detecting devices are well known in intricate mechanical form. Formerly they were quite bulky and composed of a relatively large number of parts which made for complex fabrication processes at considerable expense. With the advent of semiconductor devices, some of the intricate bulk, complexity and expense has been reduced. Semiconductor acceleration and/or pressure devices of the "leaf spring" type have been developed for sensing in a direction normal to the plane of the semiconductor chip. This limitation alone is critical in a majority of applications, the most common of which is that of sensing in more than one degree of freedom. A number of acceleration detection arrangements are based on sensing a capacitive component that varies with the degree of acceleration. Often these arrangements are too complex for use other than in cases of absolute necessity. The applications for these devices have increased considerably in the last few years whereby an inexpensive, compact, unitary, reliable and rugged acceleration detecting device is needed.

SUMMARY

The objects of the invention indirectly referred to hereinbefore, and those that will appear as the specification progresses, obtain in a unitary planar semiconductor acceleration detecting device and electric circuit arrangements having a cantilever beam arranged in a substrate for movement in a direction parallel to the plane of the substrate, and having electrodes on the beam and in the substrate between which a capacitive reactance is established that is indicative of the acceleration at the time of sampling.

By arranging two such beams at a right angle with respect to each other in a single substrate, two degrees of freedom are served. The third degree of freedom is served by adding an identical beam in the substrate and modifying the associated electric circuit to sense acceleration in the direction normal to the plane of the substrate. Thus, according to the invention, acceleration is detected in all three spatial coordinates with a single semiconductor substrate device having three cantilever beams and the associated circuitry for each integrally formed therein.

Further, in accordance with the invention, the accelerometer is fabricated by a method entirely compatible with the fabrication of Metal Oxide Silicon (MOS) transistors and like components whereby an integral structure readily obtains.

Essentially a planar substrate of n-type silicon is arranged with the major face oriented in the (100) plane. For each device a v-shaped groove is anisotropically etched in the substrate and capacitor component electrodes are diffused into the sloping walls of the groove. An epitaxial layer is grown over this substrate without substantially redefining the groove, and over that a layer of insulation is added. The insulation is first etched away to define an electrode, and a layer of conductive material is laid down on the insulation that defines the electrode. The substrate is again subjected to an anisotropic etchant for cutting the epitaxial layer from under the cantilever beam formed of the insulating layer and the conducting layer. The resultant beam is v-shaped and free to move laterally in the v-shaped groove as well as into and out of the groove. The electrodes form two variable capacitors which are connected in parallel or differentially for the acceleration sensing function.

PRIOR ART

Examples of prior art having some bearing on the development of the accelerometer of the invention as will be discussed, are to be found in the following U.S. Pat. Nos.:

| | | | |
|---|---|---|---|
| 3,084,558 | 4/1963 | Wilcox et al | 75/517 |
| 3,229,530 | 1/1966 | Wilcox et al | 73/517 |
| 3,478,604 | 11/1969 | Evans | 73/517 |
| 3,513,711 | 5/1970 | Rogall et al | 73/517 |
| 3,572,109 | 3/1971 | Yerman | 73/141 |
| 3,877,313 | 4/1975 | Ferriss | 73/516R |
| 3,911,738 | 10/1975 | Fischer | 73/141R |
| 4,009,607 | 3/1977 | Ficken | 73/141R |
| 4,071,838 | 1/1978 | Block | 338/47 |
| 4,094,199 | 6/1978 | Holdren et al | 73/517B |
| 4,129,042 | 12/1978 | Rosvold | 73/727 |
| 4,144,516 | 3/1979 | Aine | 338/2 |

And in the literature:

Simon Middelhoek, James B. Angell and Date J. W. Noorlag; "Microprocessors Get Integrated Sensors"; IEEE Spectrum; February 1980, pp 42-45 at page 44 column 2, and FIGS. [3] and [4] on page 45.

J. J. Fatula Jr., P. L. Garbarino and P. J. Tsang; "Acoustical Spectrum Analyzer on a Chip"; IBM Technical Disclosure Bulletin, Vol. 22 Nr. 11, April 1980; p. 4906 and pp. 4907-8.

The patents to Wilcox and Robinson and to Wilcox and Mullins are directed to accelerometers having capacitive sensing elements and electronic circuitry for resolving the output potentials of the sensing elements, but the arrangements differ greatly in detail from a cantilever beam arranged in a planar semiconductor substrate for lateral movement between associated electrodes according to the invention.

The patents to Evans and to Yerman disclose semiconductor beam accelerometers of the variable resistance type and bridge circuitry for resolving the data, but the arrangements differ in detail from a cantilever beam arranged in a planar semiconductor substrate for lateral movement therein between associated electrodes in accordance with the invention.

Rogall and Fennel disclose an accelerometer arrangement of a differential capacitive bridge type having a complex mechanical structure which differs greatly from a cantilever beam arranged in a planar semiconductor substrate for lateral movement therein between associated electrodes.

Ferriss and Fischer each disclose an accelerometer of the electrostatic or capacitive type which works on entirely different principles and which differs in structure from a simple planar semiconductor body encompassing a cantilever beam and associated capacitor electrodes.

The patents to Fischer and to Holdron et al. each disclose a differential capacitive type accelerometer having a weighted paddle beam moving between associated electrodes which otherwise differs greatly from a simple planar semiconductor body having a recess therein, and an integrally formed cantilever beam in the recess arranged for lateral movement between electrodes.

Block and Aine each disclose a planar semiconductor body containing an integrally formed "leaf spring" cantilever beam which is capable only of sensing in a direction normal to the plane of the body, which arrangement is functionally different from a cantilever beam arranged for lateral movement within the body.

The patent to Rosvold is directed to a semiconductor chip accelerometer having a spring membrane for sensing acceleration, and a resistive bridge arrangement, all contained in a compact mechanical package, which structure differs greatly from a planar solid state body having an integrally formed cantilever beam therein moving laterally and coupled to a capacitance type bridge circuit.

The IEEE publication is directed to accelerometers of the piezoresistive type, and thus differ from the cantilever beam accelerometer of the invention.

The IBM publications are directed to pressure analyzers arranged as a semiconductor chip having a v-shaped groove therein for forming a variable capacitance type sensor in common with the structure according to the invention without any suggestion, however, of arranging a v-shaped cantilever beam in the groove for lateral movement therein as in the arrangement of the invention.

DRAWING

In order that all of the advantages of the invention obtain in practice, the best mode embodiment thereof, given by way of example only, is described in detail hereinafter with reference to the accompanying drawing forming a part of the specification, and in which.

DESCRIPTION

Figure 1:
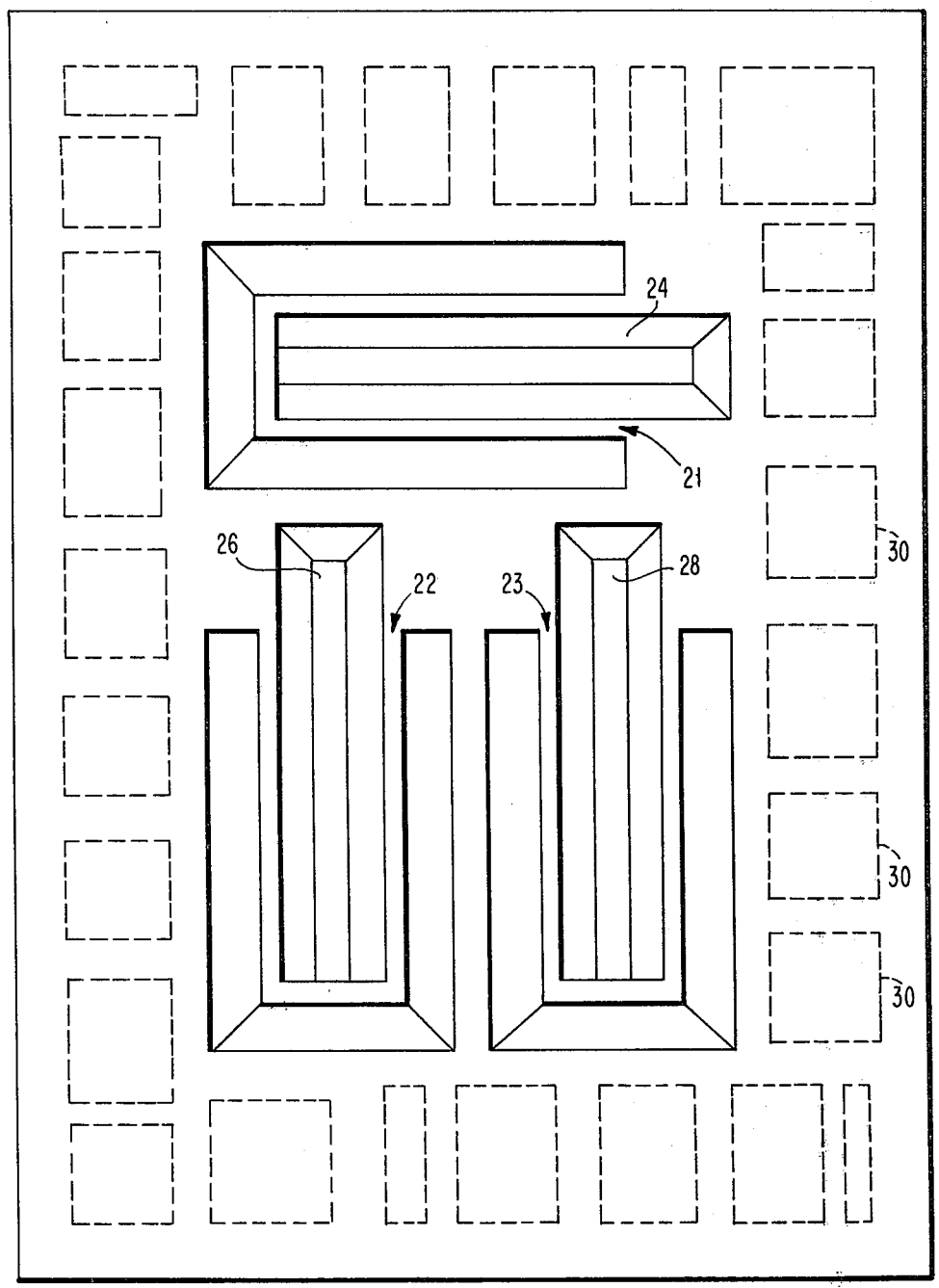
FIG. 1 is a plan view of three acceleration detecting devices as arranged for sensing acceleration in all three degrees of freedom.

An important advantage of the accelerometer of the invention is that three identical embodiments of the simple device can be arranged for sensing in all three degrees of freedom. For example, as generally shown in FIG. 1, a substrate 20 of n-type silicon for example, has three devices 21, 22, 23 according to the invention, fabricated therein as will be set forth hereinafter. One 21 of the devices is arranged in circuit for sensing acceleration in the plane of the substrate 20 and normal to the longitudinal axis of the beam 24 of the device 21, while another of the devices, say the device 22 is arranged in circuit for sensing acceleration in the plane of the substrate 20 in a direction normal to that of the first device 21. The third device 23 is now arranged in circuit in a different manner for sensing acceleration in a direction normal to the plane of the substrate 20. The substrate 20 also has other elements in the form of semiconductor device components, both active and passive, laid down as indicated roughly by the dashed line rectangles 30. It is also a feature of the invention that both the acceleration detecting devices and the other circuit elements are laid down in the same semiconductor fabrication process as will be described hereinafter.

Figure 3:
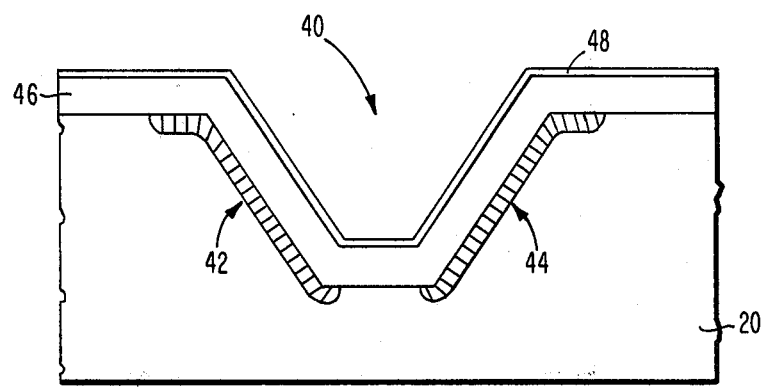
FIG. 3 is a cross-section view of the structure of the device according to the invention in the process of fabrication, taken along the line 3—3 in FIG. 2.
Figure 2:
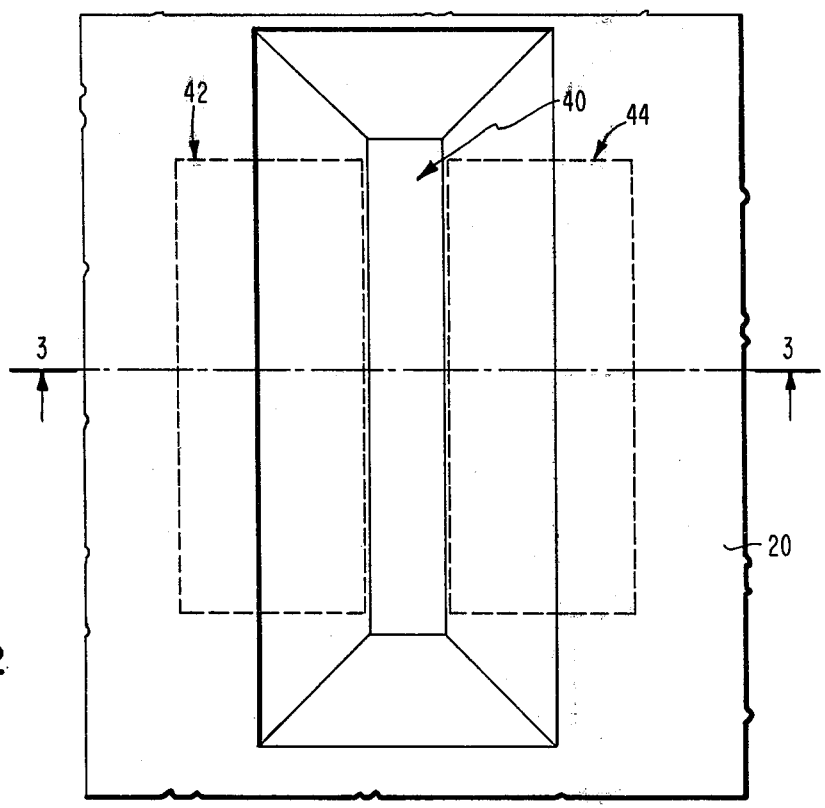
FIG. 2 is a plan view of portions of one such device.
Figure 4:
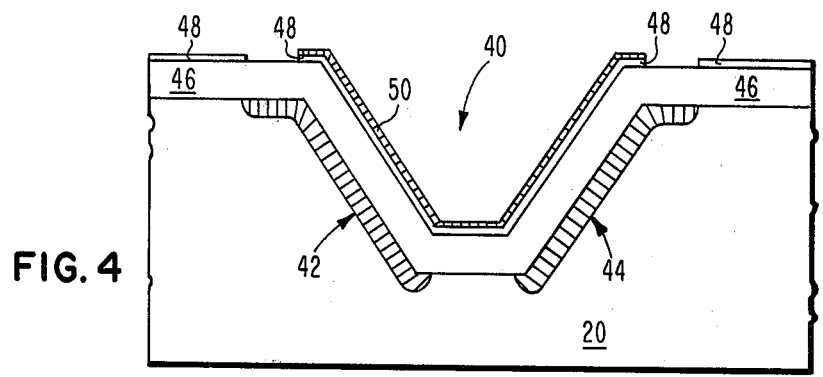
FIG. 4 is a cross-section view of the one device as shown in FIG. 2, at a later stage of fabrication.
Figure 5:
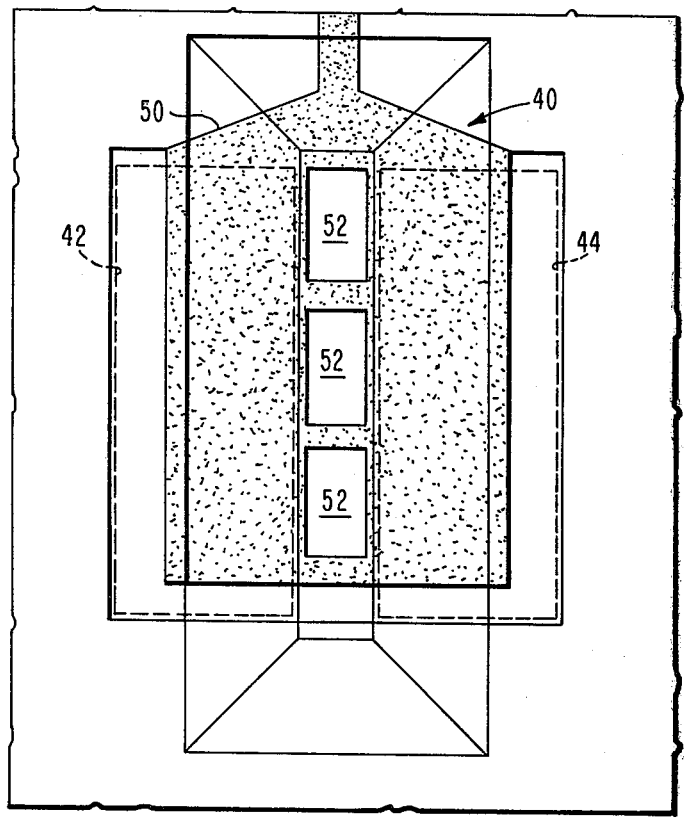
FIG. 5 is a plan view of the one device as shown in FIG. 4.
Figure 6:
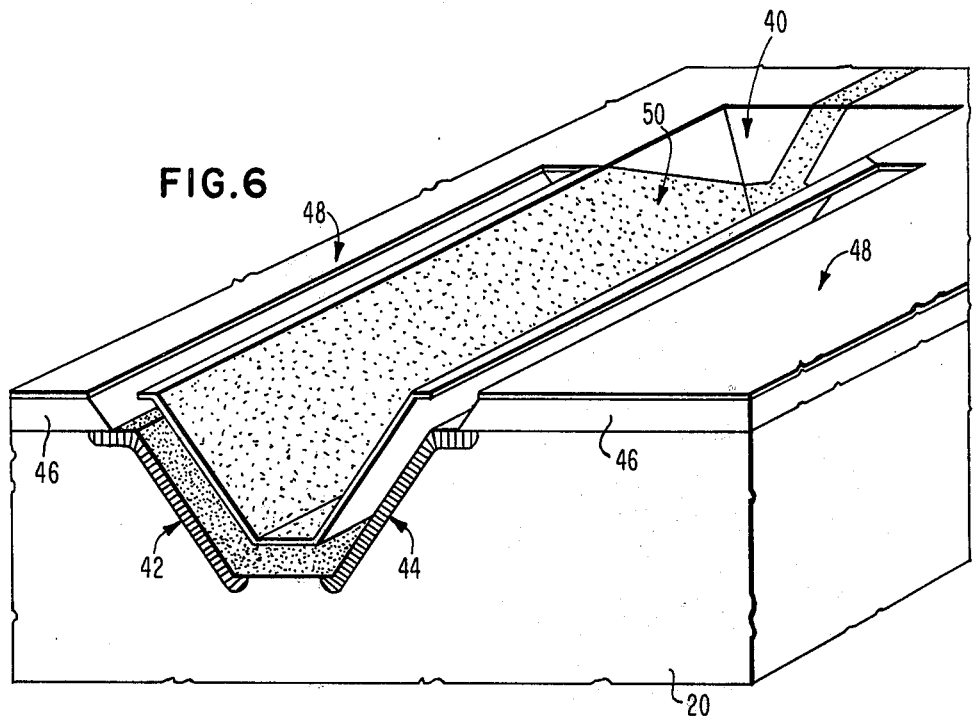
FIG. 6 is an isometric view of one such device at or near completion.

The substrate 20 is a wafer of silicon, preferably n-type formed with the major face oriented in the (100) plane. The wafer is first masked and anisotropically etched as by an etchant of the type such as ethylene diamine pyrocatechol and water to form an elongated cavity for each acceleration sensing device desired. With the major surfaces lying substantially in the (100) plane, the semiconductor crystalline structure then has internal (111) planes at a convenient angle with respect to the (100) planes, for example, in crystalline silicon at an angle of 54.°7. A suitable anisotropic etchant is used to etch pyramidal cavities in the semiconductor wafer. An anisotropic etchant works much more normally to the (100) plane than it does laterally or parallel to the (100) plane, and thus it works very much less at the (111) plane. Hence, the action of the etchant leaves pyramidal surfaces. In accordance with the process according to the invention, the wafer is first coated with etchant masking material on the obverse major surface. The anisotropic etching results in elongated frustropyramidal cavities extending from the obverse for a depth of the order of 25 μm, and having a width of the order of 50 μm, and a length of 150 μm. A plan view of one cavity 40 is shown in FIG. 2 with a cross-section view of that cavity taken along the line 3—3 in FIG. 2, in FIG. 3; it being understood that each device is substantially identical except for orientation. FIG. 2 actually shows the structure in a stage advanced by one step in the fabrication process. A pair of p+ doped regions 42, 44 are laid down on the longer walls of the cavity. This doping is better seen in FIG. 3, which actually shows the structure in a stage two steps further along. Here an epitaxial layer 46 is grown over the entire doped substrate and an insulating layer 48 is laid down. The v-shaped cavity 40 has not lost its definition to any appreciable extent and will not as fabrication progresses. Referring to FIG. 4, there is shown a cross-section view of the structure a further two steps along. First, the insulating layer 48 is etched away to define a beam within the cavity, which etching is also arranged to define an electrode on that beam, after which a layer 50 of metal or other electrically conducting material is laid over the defined area to form the electrode. A plan view is shown in FIG. 5. Next, the wafer is again subjected to an anisotropic etchant which will undercut the metal coated insulating film combination (50-48) to form a thin-walled cantilever beam without attacking the doped regions 42, 44. In some instances the beam is given greater flexibility in the lateral direction by etching the insulation 48 and metal 50 away as shown by the rectangular apertures 52. For sensing in the normal direction, this etching is better omitted. FIG. 6 is an isometric view of the completed structure.

The process for fabricating the accelerometer structure and associated integrated circuitry is outlined here.

1. Prepare an n-type monocrystalline silicon wafer with the major surface lying in the (100) plane;
2. Anisotropically etch one groove or elongated cavity for each accelerometer beam desired. Two cavities are arranged at 90° to each other, if a plurality is desired;
3. Dope sloping wall regions heavily with boron to a p+ concentration of the order of $10^{20}$ cm$^{-3}$;
4. Grow an n-type silicon epitaxial layer over the surface to a thickness of the order of 5 $\mu$m;
5. Deposit an insulating layer, of SiO$_2$ for example, over the epitaxial layer.
6. Define other semiconductor devices and the like as desired on the wafer at this step, with sub-steps as necessary;
7. Etch the insulating layer to define the accelerator beam(s) and as otherwise desired;
8. Deposit a metal layer and delineate the pattern photo-lithographically;
9. Subject the wafer to the anisotropic etchant again; and
10. Add a passivating coating if desired.

While it may seem that there may be difficulty in photolithographic processing in a depression 25 $\mu$m deep, it should be noted that the other dimensions of the beam cavity are quite large as compared to the conventional dimensions of transistors and like components. Actually the smallest feature to be resolved at the bottom of the cavity is a line 10 $\mu$m wide, which dimension is not at all critical in conventional lithographic processing.

Figure 7:
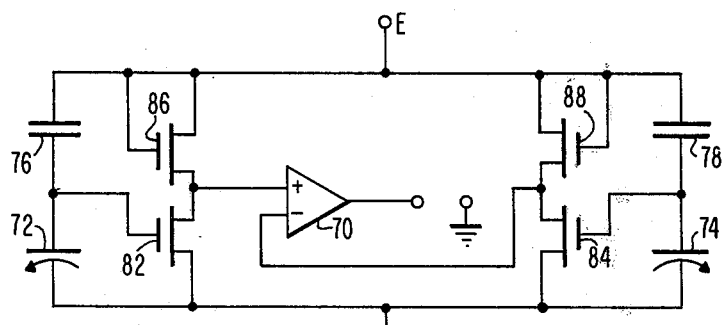
FIG. 7 is a schematic diagram of circuitry for sensing acceleration in a direction parallel to the plane of the substrate.

The acceleration detecting device according to the invention is centered about a v-shaped cavity in a planar substrate having a substantially thin-walled v-shaped cantilever beam inset therein and having electrodes on the sloping walls of the cavity and the beam. The latter is movable not only in a direction normal to the plane of the substrate, but also laterally thereof, whereby acceleration is sensed in a direction parallel to the plane of the substrate as well as in a direction normal thereto. Circuitry for resolving the bidirectional movement of the beam is shown in FIG. 7. A differential amplifying circuit 70 is connected across a bridge circuit in which two variable capacitors 72, 74 are arranged in different arms of the bridge. These capacitors 72, 74 are formed by the beam metalization as the rotor electrodes and the doped regions 42 and 44 respectively. Fixed capacitors 76, 78 and four MOSFET devices 82, 84, 86 and 88 complete the bridge circuit essentials. When the beam of the acceleration detecting device moves normally to the plane of the substrate, the variable capacitors 72, 74 vary substantially alike. The output potentials of FET 82 and 84 vary substantially in the same manner. Since the variations being applied to the differential input terminals of the amplifying circuit 70 vary in the same manner, the output potential of the amplifier circuit 70 remains unchanged. However, as the beam moves laterally the capacity of one capacitor will increase and the capacity of the other capacitor will decrease, and conversely. The output potentials of the transistors 82, 84 will be in opposition and the output of the amplifying circuit 70 will change in response to the degree of acceleration in the direction of the plane of the substrate. Calibration is a simple matter.

Figure 8:
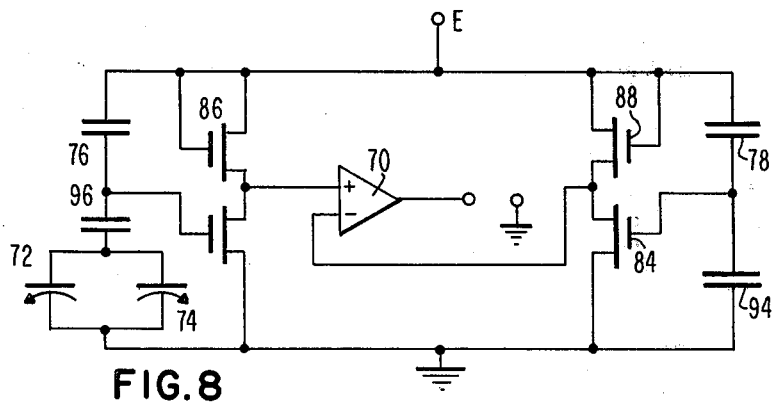
FIG. 8 is a schematic diagram of circuitry for sensing acceleration in a direction normal to the plane of the substrate.

For an accelerometer for sensing movement in a direction normal to the plane of the substrate, the circuit shown in FIG. 8 is used. Here substantially the same bridge circuit preferably is used. A fixed capacitor 94 is connected in circuit with the FET 84 and the variable capacitor 74 is connected in parallel with the variable capacitor 72 with a series capacitor 96 of value substantially that of the two capacitors 72, 74 at some reference or rest position. In this arrangement the negative input terminal of the amplifying circuit 70 is held to a reference potential with correction for temperature and like variations as before. The positive input terminal is subjected to a varying potential indicative of the normal variation of capacity due to normal movement; lateral movement variations are substantially self compensating. The series fixed capacitor 96 serves in two ways. It maintains the potential swing to the associated FET 82 the same as with but one variable capacitor, and it tends to halve any error arising from lateral movement when sensing the movement in the normal direction.

The sensitivity of accelerometers is easily estimated based on beam dimensions according to the invention. The fractional changes in capacitance is expressed:

$$\Delta C/C = k(\delta/2d_o) \tag{1}$$

where
$\delta$ is the movement of the membrane tip,
k is a geometrical factor correcting for the angle 54.°7, and
$d_o$ is the equilibrium metal/p+ spacing.

For a uniform acceleration:

$$\Delta C/C = \frac{3}{8}(\rho l^4/Et^2 d_o)ak \tag{2}$$

where
$\rho$ is the insulator density,
l is the membrane length,
E is Young's modulus,
t is the membrane thickness, and
a is the acceleration.

For an SiO$_2$ cantilever beam 200 $\mu$m long, 0.5 $\mu$m thick, spaced 5 $\mu$m from the p+ layer:

$$\Delta C/C = 4 \times 10^{-4}/g. \tag{3}$$

With a 5 V supply in the circuits of FIG. 7 or 8, this corresponds to 4 mV/g going directly to the differential amplifier on the same chip, adjacent to the acceleration detecting device.

Beams according to the invention have proved to be reliable in tests of over $10^{10}$ deflections observed with no change in properties, to be operable at high resonant frequency over 1 kHz, and to be rugged in that 250 g will deflect the beam only about 0.5 $\mu$m. Furthermore, linearity to 1% is assured as long as $\Delta C/C < 10^{-2}$. Since typical MOS operational amplifiers are sensitive well into the microvolt range, accuracies of 1% obtain when on-chip operational amplifiers are integrated with sensors. Calibration of individual units is easily accomplished during a test procedure by measuring the chip response to a fixed acceleration, then adjusting the gain of the operational amplifier either by laser trimming or by writing a calibration code into a small on-chip programmed reproducing store, which will allow the device to calibrate the signal before it is transmitted.

While the invention has been described in terms of an express embodiment, and alternatives have been suggested, it is clearly to be understood that those skilled in the art will effect further changes without departing from the spirit and scope of the invention as defined in the appended claims concluding the specification.

The invention claimed is:

1. A planar semiconductor acceleration detecting device comprising
   a substrate of semiconductor material having an elongated v-shaped cavity therein,
   a v-shape cantilever beam arranged in said v-shaped cavity and depending from one end thereof for movement into and out of said cavity and movement from side to side in said cavity,
   electrodes of conductive material arranged on the sloping walls of said cavity and on the sloping walls of said beam, and
   an electronic circuitry coupled to said electrodes and arranged for indicating the degree of acceleration to which said device is subjected in terms of the instantaneous capacity between said electrodes in said cavity and on said beam.

2. A planar semiconductor acceleration device as defined in claim 1, and wherein
   said electronic circuitry comprises
   an electric bridge circuit having four arms each comprising a capacitor with two arms comprising variable capacitors formed by the electrodes on the sloping walls of said cavity and on the sloping walls of said beam,
   an electric energizing potential source connected across one diagonal of said bridge circuit,
   a differential amplifier circuit having output terminals at which an indication of acceleration is delivered and differential input terminals coupled across the other diagonal of said bridge circuit.

3. A planar semiconductor acceleration device as defined in claim 2, and wherein
   said input terminals of said differential amplifier circuit are coupled across said bridge circuit by four field effect transistors connected to said capacitors as to vary the resistance in accordance with the variable capacitor connected between the gate electrode and the drain electrode in said two arms, thereby to unbalance said amplifier circuit in accordance with the degree of acceleration to which said device is subjected.

4. A planar semiconductor acceleration detecting device comprising
   an n-type silicon substrate having an elongated v-shaped cavity therein,
   electrodes of p+ boron diffused in the sloping walls of said circuitry,
   a v-shaped cantilever beam arranged in said v-shaped cavity and depending from one end thereof for movement into and out of said cavity and movement from side to side in said cavity,
   metal electrode material arranged on the sloping walls of said beam, and
   an electronic circuitry coupled to said electrodes and arranged for indicating the degree of acceleration to which said device is subjected in terms of the instantaneous capacity between said electrodes in said cavity and on said beam.

5. A planar semiconductor acceleration detecting device comprising
   an n-type silicon substrate having an elongated v-shaped cavity therein,
   electrodes of p+ boron diffused in the sloping walls of said circuitry,
   a thin-walled v-shaped cantilever beam SiO$_2$ arranged in said v-shaped cavity and depending from one end thereof for movement into and out of said cavity and movement from side to side in said cavity,
   conductive electrode material arranged on the sloping walls of said beam, and
   an electronic circuitry coupled to said electrodes and arranged for indicating the degree of acceleration to which said device is subjected in terms of the instantaneous capacity between said electrodes in said cavity and on said beam.

6. A method of fabricating a planar semiconductor device having a cantilever beam arranged therein for movement in a direction parallel to the plane of said device, comprising the steps of:
   preparing a monocrystalline silicon wafer with the major surface lying in the (100) plane,
   anisotropically etching an elongated pyramidal cavity in said wafer from said major surface,
   doping sloping wall regions defining said cavity with a dopant of type opposite to the type of said wafer,
   growing an epitaxial layer over the major surface and the sloping walls of said cavity,
   depositing an insulating layer over all of said epitaxial layer,
   etching said insulating layer to define said cantilever beam over said cavity with the beam depending from one narrow end of the cavity,
   depositing a layer of conductive material over said insulating layer and delineating the pattern photolithographically, and
   anisotropically etching away the epitaxial layer from under said beam.

7. A method of fabricating a planar semiconductor device having a cantilever beam arranged therein for movement in a direction parallel to the plane of said device, comprising the steps of:
   preparing an n-type monocrystalline silicon wafer with the major surface lying in the (100) plane,
   anisotropically etching an elongated pyramidal cavity in said wafer from said major surface,
   doping sloping wall regions defining said cavity with a dopant of p+ boron,
   growing an n-type epitaxial layer over the major surface and the sloping walls of said cavity,
   depositing an insulating layer of SiO$_2$ over all of said epitaxial layer,
   etching said insulating layer to define said cantilever beam over said cavity with the beam depending from one narrow end of the cavity,
   depositing a layer of aluminum over said insulating layer and delineating the pattern photolithographically, and
   anisotropically etching away the epitaxial layer from under said beam.

8. A method of fabricating a planar semiconductor device as defined in claim 7, and incorporating the step of:
   processing said wafer, after depositing said insulating layer, for defining field effect transistor, capacitors, resistors and the like for interconnection as electronic circuitry for indicating the degree of acceleration and the like.

9. A planar semiconductor acceleration detecting device, comprising
   a substrate of semiconductor material having two elongated v-shaped cavities therein arranged with the longitudinal axes at 90° with respect to each other, a v-shaped cantilever beam arranged in each of said v-shaped cavities and depending from one end thereof for movement from side to side in said cavity, electrodes of conductive material arranged on the sloping walls of said cavities and on the sloping walls of said beams, and an electronic circuitry coupled to said electrodes and arranged for indicating the degree of acceleration to which said device is subjected in terms of the instantaneous capacity between said electrodes in said cavities and on the respective beams, thereby to indicate acceleration components in two directions substantially parallel to the plane of said substrate.

10. A planar semiconductor acceleration detecting device as described in claim 9, and incorporating a third v-shaped cavity and v-shaped beam assembly and electrodes therefor, and electronic circuitry coupled to the electrodes for determining the acceleration in a direction normal to the plane of said substrate.

* * * * *